US006616888B1

(12) United States Patent
Lindquist et al.

(10) Patent No.: US 6,616,888 B1
(45) Date of Patent: Sep. 9, 2003

(54) METHOD FOR A TWO-PART RESILIENT BUMPER

(75) Inventors: John E. Lindquist, Lombard, IL (US); Frank V. Plimi, Jr., Arlington Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/273,864

(22) Filed: Mar. 22, 1999

(51) Int. Cl.$^7$ ................................................ B29C 39/12
(52) U.S. Cl. .................... 264/510; 264/255; 264/297.8; 264/DIG. 57
(58) Field of Search ................................ 264/520, 255, 264/294, 297.8, 308, 298, 245, DIG. 57; 20/82; 3293/120

(56) References Cited

U.S. PATENT DOCUMENTS

| 2,948,651 A | * | 8/1960 | Waag ........................ 154/110 |
| 4,389,454 A | * | 6/1983 | Horacek et al. ......... 428/318.6 |
| 4,999,227 A | | 3/1991 | Vander Togt ................ 428/31 |
| 5,409,199 A | | 4/1995 | Kahmann ................... 267/153 |
| 5,662,996 A | * | 9/1997 | Jourquin et al. ......... 428/318.8 |

FOREIGN PATENT DOCUMENTS

| CA | 2285068 | | 10/1998 |
| DE | 3821187 A | * | 1/1989 |
| JP | 04320817 A | * | 11/1992 |

OTHER PUBLICATIONS

Dennis Chemical Company, Polyurethane Compound Data Sheets (3), "DENFLEX RX–32033–C/9805", "DENFLEX RX–31957–A/9805", and "DENFLEX RX–985–2/9805".

* cited by examiner

Primary Examiner—Jan H. Silbaugh
Assistant Examiner—Edmund H. Lee
(74) Attorney, Agent, or Firm—Mark W. Croll; Paul F. Donovan

(57) ABSTRACT

A two-part resilient bumper formed by depositing a first liquified resilient material into a bumper cavity of a mold plate, distributing the first liquified resilient material over a bottom portion of the bumper cavity before depositing a second liquified resilient material into the bumper cavity on top of the first liquified resilient material, and curing the first and second liquified resilient materials to form a first resilient material bonded to a second resilient material, wherein the first and second resilient materials have different performance characteristics when cured.

20 Claims, 2 Drawing Sheets

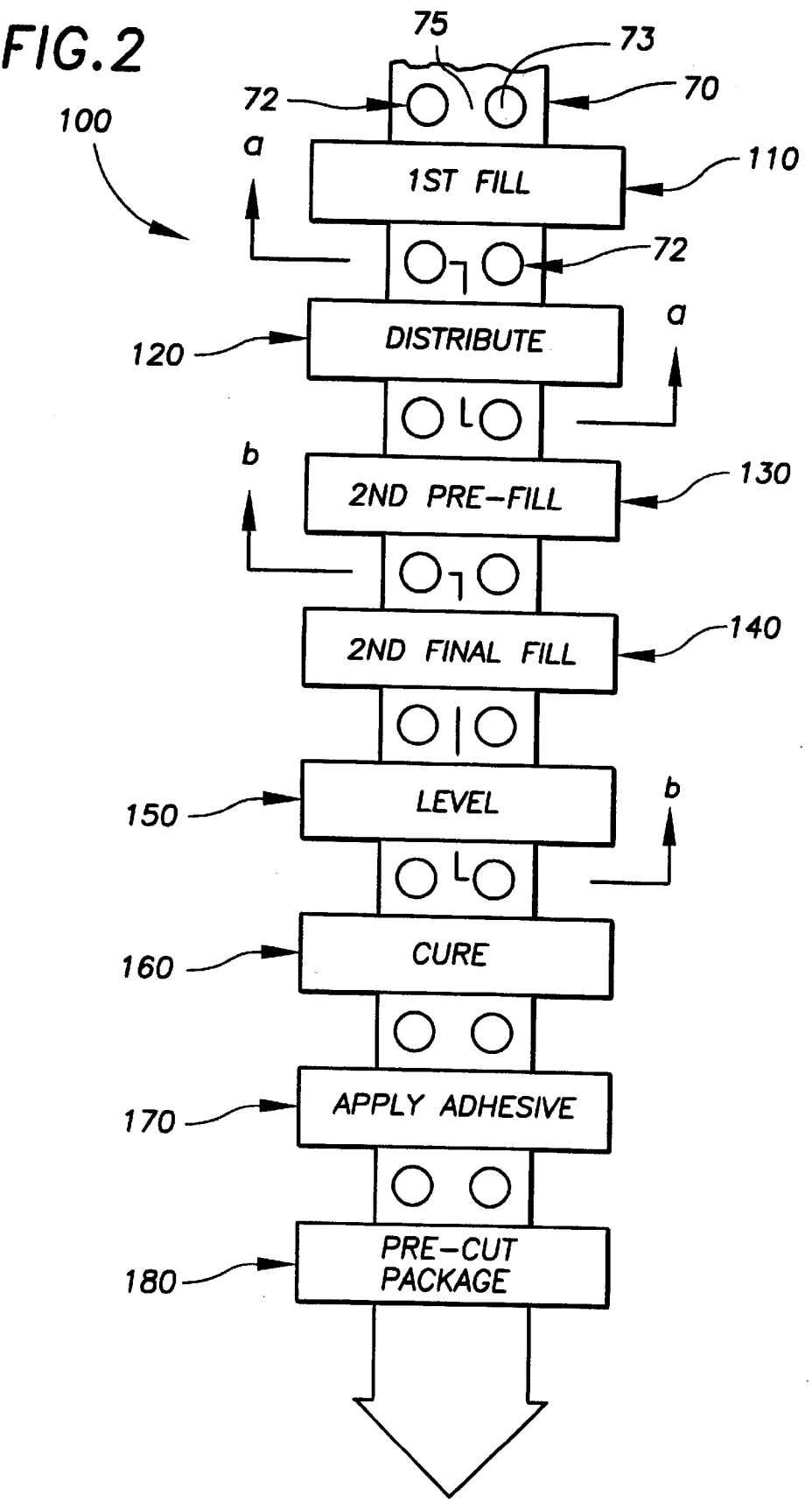

METHOD FOR A TWO-PART RESILIENT BUMPER

BACKGROUND OF THE INVENTION

The invention relates generally to surface protecting resilient bumpers, and more particularly to two-part resilient, surface protecting bumpers and methods therefor.

Resilient bumpers are known generally and used widely for protecting surfaces from scratching and skidding, for use as spacers and stand-offs, and for absorbing shock, and for dampening and isolating sound and vibration, among other uses. Resilient bumpers made from URETHANE and PVC materials available from ITW Fastex, Des Plaines, Ill., for example, come in a variety of shapes, sizes and colors with a self-adhering mounting surface on a matrix pad, which is pre-cut for easy removal and ready installation of the resilient bumpers on everything from cabinet doors and furnishings to printed circuit boards and electronic equipment, among other applications.

In one known process for manufacturing resilient bumpers, TEFLON coated die or mold plates having an array of recessed bumper cavities move end to end along a continuous conveyer. The die plates move first below a pre-fill station that dispenses a small quantity of a self-curing, liquified resilient material into the bumper cavities on the die plates to prevent the formation of air pockets therein during a subsequent filling operation. The liquified resilient material is supplied continuously to the bumper cavities from one or more relatively small diameter supply lines disposed a centimeter or so above the die plates and in alignment with each row of bumper cavities. After the pre-fill operation, the die plates move along the conveyor to a fill station where the bumper cavities and the recesses of the die plates are filled entirely with the liquified resilient material, which is thereafter leveled with a TEFLON coated scraper blade as the die plates move past the fill station. The die plates then move preferably past a heating station to accelerate the curing of the liquified resilient material. After curing, the die plates are separated from the resilient bumpers, which are interconnected by a continuous web of resilient material. An acrylic or other mounting adhesive and a removable cover strip are applied to the continuous web for some applications, and the resilient bumpers are pre-cut to permit separation thereof from the continuous web.

It is known generally to form the resilient bumpers from different materials to provide bumpers having different performance characteristics. In some applications, for example, it is desirable for the bumpers to slip or slide along the surface, whereas in other applications it is desirable for the bumpers to grip the surface to prevent sliding. Generally, resilient bumpers made from harder materials have reduced surface friction, and softer material bumpers have better surface friction. A bumper formed of a harder material for reduced surface friction, however, is not as effective, for example, for shock absorption or vibration isolation as is a bumper formed of a softer material. Similarly, a softer bumper that provides increased surface friction does not provide the same degree of firm support as does a harder bumper. Thus, in the past, there has been a trade-off between the performance characteristics of resilient bumpers based the hardness thereof, or more generally based on the material from which the bumper was formed. Yet, in many applications, it is desirable for resilient bumpers to have performance characteristics of both hard and soft materials, or more generally to have performance characteristics of more than one material.

The invention is drawn toward advancements in the art of resilient bumpers.

An object of the invention is to provide novel resilient bumpers and methods therefor that overcome problems in the art.

Another object of the invention is to provide novel resilient bumpers and methods therefor that are economical.

A further object of the invention is to provide novel resilient bumpers formed of at least two different resilient materials to provide resilient bumpers having performance characteristics of the two or more materials.

Another object of the invention is to provide novel resilient bumpers and methods therefor comprising generally a resilient body member having a surface engaging end portion with a surface contacting end, a fastening end portion with a fastening end, and a side portion with an axial dimension between the surface contacting end and the fastening end. The surface engaging end portion of the body member is formed of a first resilient material, and an axial portion of the resilient body member adjacent the surface engaging end portion thereof is formed of a second resilient material having a different performance characteristic than the first resilient material. The first and second resilient materials are bonded when the first and second liquified resilient materials are cured to a solid state.

Yet another object of the invention is to provide novel methods for making novel resilient bumpers comprising generally depositing a first liquified resilient material into a bumper cavity of a mold plate, depositing a second liquified resilient material into the bumper cavity on top of the first liquified resilient material, and curing the first and second liquified resilient materials to form a first resilient material bonded to a second resilient material, the first and second resilient materials having different performance characteristics.

Still another object of the invention is to provide novel methods for making novel resilient bumpers comprising generally depositing a first liquified resilient material into a bumper cavity of a mold plate, distributing the first liquified resilient material in the bumper cavity before depositing a second liquified resilient material into the bumper cavity on top of the first liquified resilient material, and curing the first and second liquified resilient materials to form a first resilient material bonded to a second resilient material, the first and second resilient materials having different performance characteristics.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 2 is an exemplary process flow diagram for making resilient bumpers.

DETAILED DESCRIPTION OF THE INVENTION

Figure 1:
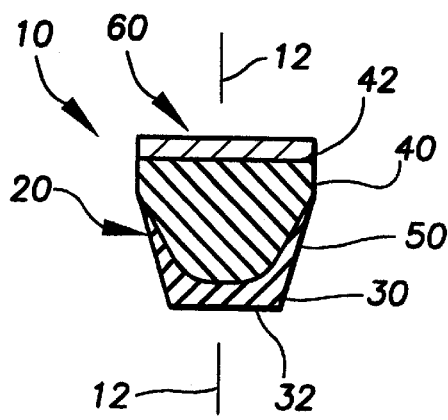
FIG. 1 is a resilient bumper formed of more than one resilient material according to the present invention.

FIG. 1 is a partial sectional view of a resilient bumper 10 according to an exemplary embodiment of the present invention. The resilient bumper comprises generally a resilient body member 20 having a surface engaging end portion 30 with a surface contacting end 32, a fastening end portion 40 with a fastening end 42, and a side portion 50 with an axial dimension 12 between the surface engaging end 32 and the fastening end 42. The resilient bumper 10 of FIG. 1 has a generally semi-conically shaped side portion 50 formed symmetrically about the axial dimension 12 thereof between the surface contacting end 32 and the fastening end 42. The surface contacting end 32 of the body member 20 is disposed generally opposite the fastening end 42 thereof so that the surface contacting end 32 and fastening end 42 are perpendicular to the axial dimension 12. In the exemplary embodiment, an adhesive material 60 is disposed on the fastening end 42 of the resilient body member 20 for fastening the resilient bumper 10 to an article, as is known generally.

In other embodiments, the resilient bumper 10 may have any sectional shape, for example a cylindrical or polygonal sectional shape, or combination thereof. Alternatively, the side portion 50 is not necessarily formed symmetrically about the axial dimension 12. Also, the surface contacting end 32 and the fastening end 42 are not necessarily perpendicular to the axial dimension 12 of the body member 20. The side portion 50 between the surface contacting end 32 and the fastening end 42 preferably has some draft along an axial portion thereof to permit separation of the resilient bumper 10 from a bumper cavity of a mold plate. In other embodiments, the surface engaging end portion 30 of the resilient bumper 10 may have a recess therein, not shown, to form an annular surface contacting end as is known.

According to the present invention, the surface engaging end portion 30 of the body member 20 is formed of a first resilient material, and an axial portion of the resilient body member 20 adjacent the surface engaging end portion 30 thereof is formed of a second resilient material. In the exemplary embodiment, the axial portion of the resilient body member 20 formed of the second resilient material includes the fastening end portion 40 of the body member 20. More generally, several adjacent axially portions of the body member may be formed of different resilient materials. In other words, the body member may have multiple layered segments formed of different resilient materials stacked one on top of the other along the axial dimension thereof between the surface contacting end and the fastening end.

Generally, the two or more resilient materials forming the body member have different performance characteristics. In the exemplary embodiment, the first and second materials have a different hardness to provide a resilient bumper that has performance characteristics of both hard and soft resilient materials.

In one embodiment, the first resilient material forming the surface contacting end portion 30, including the surface contacting end 32, is relatively hard to permit relatively easy sliding of the resilient bumper 10 over a surface, and the second resilient material forming the fastening end portion 40 of the body member 20 is relatively soft to provide better shock absorption or vibration dampening or sound isolation than is possible with the harder resilient material of the surface contacting end portion 30. In this exemplary embodiment, the axial dimension of the surface engaging end portion 30 of the body member 20 is relatively short in comparison to the axial dimension of the fastening end portion 40 thereof, since only a relatively thin continuous layer of the harder first resilient material is required to provide the desired surface sliding action of the resilient bumper. The axial dimension of the first resilient material may be increased however if it is desirable to lessen the degree to which the relatively soft second material effects the performance of the resilient bumper 20.

In another embodiment, the first resilient material forming the surface contacting end portion 30, including the surface contacting end 32, is relatively soft to inhibit sliding of the resilient bumper 10 over a surface, and the second resilient material forming the fastening end portion 40 of the body member 20 is relatively hard to provide firmer resilient bumper support than is possible with the softer resilient material of the surface contacting end portion 30. In this exemplary embodiment, the axial dimension of the surface engaging end portion 30 of the body member 20 is also relatively short in comparison to the axial dimension of the fastening end portion 40 thereof, since only a relatively thin continuous layer of the softer first resilient material is required to provide the desired surface engaging action of the resilient bumper. The axial dimension of the first resilient material may be increased however if it is desirable to lessen the degree to which the relatively hard second material effects the performance of the resilient bumper.

In one embodiment, the first resilient material is a first polyurethane compound having a first base component and a first hardener component, and the second resilient material is a second polyurethane compound having a second base component and a second hardener component. The first and second polyurethane compounds are prepared individually in liquified forms, and poured into a bumper mold cavity one on top of the other and cured, whereby the first and second resilient materials are bonded after curing, as discussed below.

One exemplary polyurethane compound suitable for the present invention has a Shore A hardness of approximately 90, and is known commercially as DENFLEX RX32033-C/9805, available from Dennis Chemical Company, St. Louis, Mo. Other exemplary polyurethane compounds suitable for the present invention have a Shore A hardness of approximately 60, and are known commercially as DENFLEX 9855-2/9805 and DENFLEX RX-31957A/9805, also available from Dennis Chemical Company, St. Louis, Mo. Polyurethane materials having other hardness values may also be used, depending on the requirements of the particular application. Additionally and alternatively, materials other than polyurethane may be used.

FIG. 2 illustrates an exemplary diagrammatic process flow diagram 100 for manufacturing resilient bumpers having two or more parts according to the present invention. Generally one or more mold plates 70 having one or more bumper cavities 72 formed therein are moved end to end along a conveyor, as is known generally. The process 100 comprises generally first depositing a first liquified resilient material into one or more bumper cavities 72 of the mold plate 70 in a first fill operation 110.

Figure 3A:
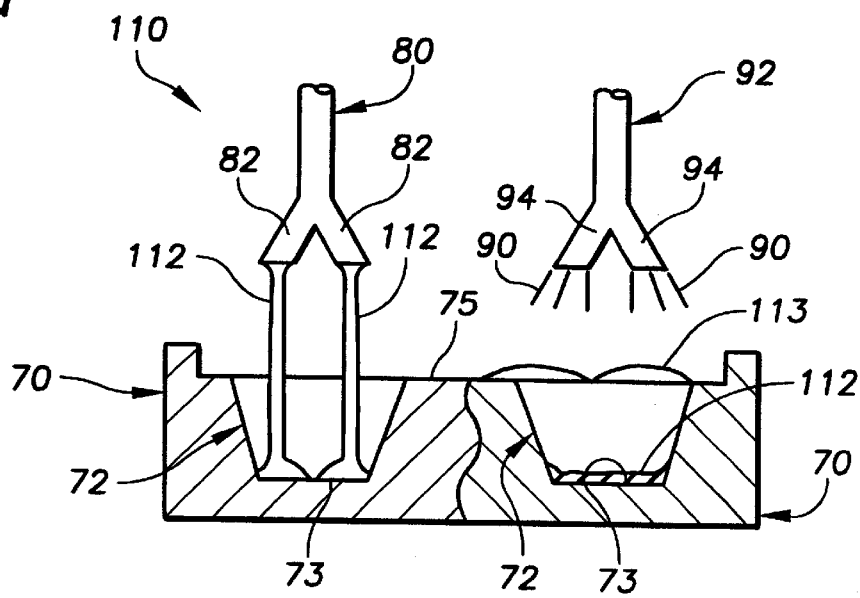
FIG. 3a is a partial sectional view along lines a—a of FIG. 2.

FIG. 3a is a partial sectional view of an exemplary first fill operation 110 illustrating the first liquified resilient material 112 being deposited into the bumper cavity 72 from a corresponding first supply line 80, which may have one or more branched outlets 82, disposed above the mold plate 70 moving relative thereto. The amount of first liquified resilient material deposited into each bumper cavity 72 is preferably sufficient in quantity to form at least a continuous layer of the first liquified resilient material on a bottom portion of 73 the bumper cavity 72, so that the entire surface contacting end of the resilient bumper molded therein is formed of the first liquified resilient material, thereby most effectively providing the desired performance.

After the first fill operation 110, a second liquified resilient material is deposited into the one or more bumper cavities 72 onto the first liquified resilient material deposited previously into the bottom portion 73 thereof, and before curing of the first resilient material. In FIG. 2, the second liquified resilient material is deposited partially into the one or more bumper cavities 72 in a second pre-fill operation 130, and in a second subsequent final fill operation 140, after deposition of the first liquified resilient material.

Figure 3B:
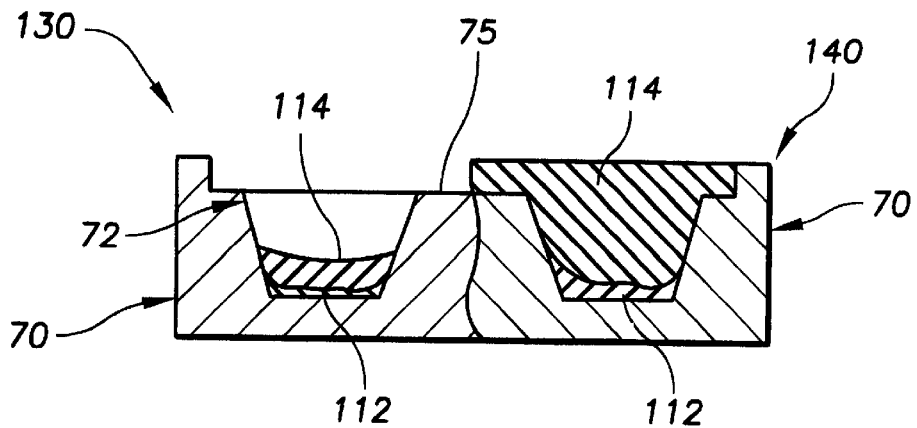
FIG. 3b is a partial sectional view along lines b—b of FIG. 2.

FIG. 3b is a partial sectional view of an exemplary second pre-fill operation 130 and an exemplary second final filling operation 140, wherein a second liquified resilient material 114 is deposited into the bumper cavity 72 from a corresponding second line supply disposed above the mold plate 70, not shown but known generally and similar to the first supply line 80 of FIG. 3a. Generally, a relatively small amount of second liquified resilient material is deposited into the bumper cavity 72 in the second pre-fill operation 130 in comparison to the final filling operation 140 to prevent splashing and displacement of the first liquified resilient material 112 from the bottom portion 73 of the bumper cavity 72 during the final filling operation 140. In some applications, however, the second liquified resilient material is deposited into the bumper cavity in a single operation, and it is not necessary to separate the second liquified resilient material deposition operation into the pre-filling and final filling operations as in the exemplary embodiment.

In FIG. 2, the first liquified resilient material deposited into the bumper cavity is distributed thereabout to cover the entire bottom portion 73 of the bumper cavity 72 in a distribution operation 120 performed before depositing the second and any subsequent liquified resilient materials into the bumper cavity. In FIG. 3a, distribution of the first liquified resilient material 112 over the bottom portion 73 of the bumper cavity 72 is performed by directing a compressed gas 90, for example compressed air, into the bumper cavity 72 onto the first liquified resilient material 112 deposited therein. The compressed gas preferably distributes the first liquified resilient material substantially evenly over the bottom portion 73 of the bumper cavity 72 to form at least a continuous layer of the first liquified resilient material thereon covering all portions of the bottom portion 73, thereby ensuring that the resilient bumper formed in the bumper cavity has a uniform surface contacting end formed substantially entirely of the first resilient material. The compressed gas also helps eliminate any air that may be trapped in the first liquified resilient material, thereby eliminating or at least substantially reducing any pitting formed thereby on the resilient bumper after molding.

In embodiments where the mold plate 70 comprises a plurality of bumper cavities 72 separated by web portions 75 of the mold plate, as illustrated in FIGS. 2, 3a and 3b, some of the first liquified resilient material 113 intended for the bumper cavities 72 is invariably deposited on the web portions 75 during the first filling operation 110, as illustrated in FIG. 3a. It is generally desirable to remove the first liquified resilient material 113 from the web portions 75 of the mold plate 70 before depositing the second liquified resilient material into the plurality of bumper cavities 72, partly to prevent contamination of the second liquified resilient material. In FIG. 3a, the first liquified resilient material 113 is removed from the web portions 75 of the die plates by directing the compressed gas also onto the web portions 75 of the mold plate 70. Alternatively, a scraper blade, not shown, disposed above the mold plate may perform this operation by wiping the first liquified resilient material therefrom.

In the exemplary embodiment, the compressed gas 90 is compressed air supplied from an air supply line 92, which may have one or more having branched outlets 94, disposed above the mold plate 70. The velocity and mass flow rate of the compressed gas depends generally on the quantity and viscosity of the first liquified resilient material, and may be determined without undue experimentation in view of the disclosure herein.

As discussed above, the first and second liquified resilient materials form corresponding first and second resilient materials having different performance characteristics when cured, for example different frictional coefficients based on hardness. According to the present invention, the second liquified resilient material is deposited into the bumper cavity 72 on top of the first liquified resilient material before the curing so that the resulting first and second resilient materials formed thereby are bonded together after curing. In some applications, depending generally on the viscosity of the second liquified resilient material, it may be desirable to level the second liquified resilient material in the mold plate in a leveling operation 150, for example with a scraper blade as is known generally.

After depositing the first and second liquified resilient materials in the one or more bumper cavities and after any leveling operation, the first and second liquified resilient materials are cured to form a first resilient material bonded to a second resilient material. As discussed above, the polyurethane compounds of the exemplary embodiments have a hardening component and are self-curing. It is generally desirable to accelerate curing by applying heat, or some other accelerator, thereto in a curing operation 160, as is known.

In some applications an adhesive is applied to the fastening end of the resilient bumpers in an adhesive application operation 170, as is known generally and discussed above. After curing and after the application of any adhesive to the resilient bumpers, the bumpers may be pre-cut for separation from any interconnecting resilient web and packaged at 180.

While the foregoing written description of the invention enables those of ordinary skill to make and use what is considered presently to be the best mode thereof, those of ordinary skill will understand and appreciate the existence of variations, combinations, and equivalents of the exemplary embodiments. The invention is therefore to be limited not by the exemplary embodiments, but by all embodiments within the scope and spirit of the claims.

What is claimed is:

1. A method for making resilient bumpers comprising:
depositing a first liquified resilient material into a bumper cavity of a mold plate;
depositing a second liquified resilient material into the bumper cavity of the mold plate on top of the first liquified resilient material before curing the first resilient material; and
forming a first resilient material bonded to a second resilient material by curing the first and second liquified resilient materials deposited into the bumper cavity,
the first and second resilient materials having different performance characteristics.

2. The method of claim 1 further comprising distributing the first liquified resilient material over a bottom portion of the bumper cavity before depositing the second liquified resilient material into the bumper cavity.

3. The method of claim 2, distributing the first liquified resilient material in the bumper cavity by directing a compressed gas onto the first liquified resilient material deposited in the bumper cavity.

4. The method of claim 1 further comprising depositing the first liquified resilient material into the bumper cavity in sufficient quantity to form a continuous layer of the first liquified resilient material covering a bottom portion of the bumper cavity.

5. The method of claim 1, further comprising depositing the second liquified resilient material in the bumper cavity in a first pre-filling operation and in a second subsequent final filling operation.

6. The method of claim 5, the pre-filling operation deposits a relatively small amount of the second liquified resilient material in the bumper cavity in comparison to the final filling operation.

7. The method of claim 1, depositing the first and second liquified resilient materials into the bumper cavity from corresponding first and second supply lines disposed above the mold plate.

8. The method of claim 1, further comprising:
depositing the first liquified resilient material into a plurality of bumper cavities of the mold plate, the plurality of bumper cavities arranged in a matrix and separated by web portions of the mold plate;
depositing the second liquified resilient material into the plurality of bumper cavities of the mold pate on top of the first liquified resilient material before curing the first and second liquified resilient materials.

9. The method of claim 8 further comprising forming a continuous layer of the first liquified resilient material over a bottom portion of the plurality of bumper cavities by distributing the first liquified resilient material in the plurality of bumper cavities before depositing the second liquified resilient material in the plurality of bumper cavities.

10. The method of claim 9, distributing the first liquified resilient material in the plurality of bumper cavities by directing a compressed gas onto the first liquified resilient material deposited therein.

11. The method of claim 8 further comprising removing first liquified resilient material from web portions of the mold plates before depositing the second liquified resilient material into the plurality of bumper cavities.

12. The method of claim 11, distributing the first liquified resilient material in the plurality of bumper cavities and removing first liquified resilient material from the web portions of the mold plates by directing a compressed gas onto the mold plates.

13. The method of claim 8 further comprising depositing the first liquified resilient material into the plurality of bumper cavities in sufficient quantity to form a continuous layer of the first liquified resilient material on bottom portions thereof.

14. The method of claim 8 further comprising depositing the second liquified resilient material in the plurality of bumper cavities in a first pre-filling operation and in a second subsequent final filling operation.

15. The method of claim 14, depositing the first and second liquified resilient materials into the plurality of bumper cavities from corresponding first and second supply lines disposed above the mold plate.

16. A method for making resilient bumpers comprising:
depositing a first liquified resilient material into a bumper cavity of a mold plate;
depositing a second liquified resilient material into the bumper cavity of the mold plate on top of the first liquified resilient material before solidifying the first resilient material; and
forming a first resilient material bonded to a second resilient material by solidifying the first and second liquified resilient materials deposited into the bumper cavity,
the first and second resilient materials having different performance characteristics.

17. The method of claim 16, distributing the first liquified resilient material in the bumper cavity by directing a compressed gas onto the first liquified resilient material deposited in the bumper cavity before solidifying the first resilient material.

18. The method of claim 16 further comprising depositing the second liquified resilient material in the bumper cavity in a first pre-filling operation and in a second subsequent final filling operation.

19. A method for making resilient bumpers comprising:
depositing a first liquified resilent material into a bumper cavity of a mold plate by dispensing the first liquified resilient material from a first supply line disposed above the bumper cavity;
depositing a second liquified resilient material into the bumper cavity of the mold plate on top of the first liquefied resilient by dispensing the second liquified resilient material from a second supply line disposed above the bumper cavity material before solidifying the first resilient material; and
forming a first resilient material bonded to a second resilient material by solidifying the first and second liquified resilient materials deposited into the bumper cavity,
the first and second resilient materials having different performance characteristics.

20. The method of claim 19, distributing the first liquified resilient material over a bottom surface of the bumper cavity by directing a compressed gas onto the first liquified resilient material deposited in the bumper cavity before solidifying the first resilient material.

* * * * *